July 9, 1957

A. M. COMPTON 2,798,735

MULTI-SPRING UNDERCARRIAGE FOR VEHICLES

Filed Jan. 17, 1955

INVENTOR.
Arthur M. Compton
BY
ATTORNEY.

July 9, 1957  A. M. COMPTON  2,798,735
MULTI-SPRING UNDERCARRIAGE FOR VEHICLES
Filed Jan. 17, 1955  2 Sheets-Sheet 2
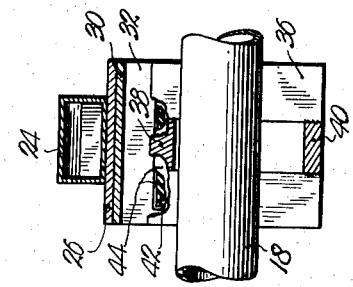
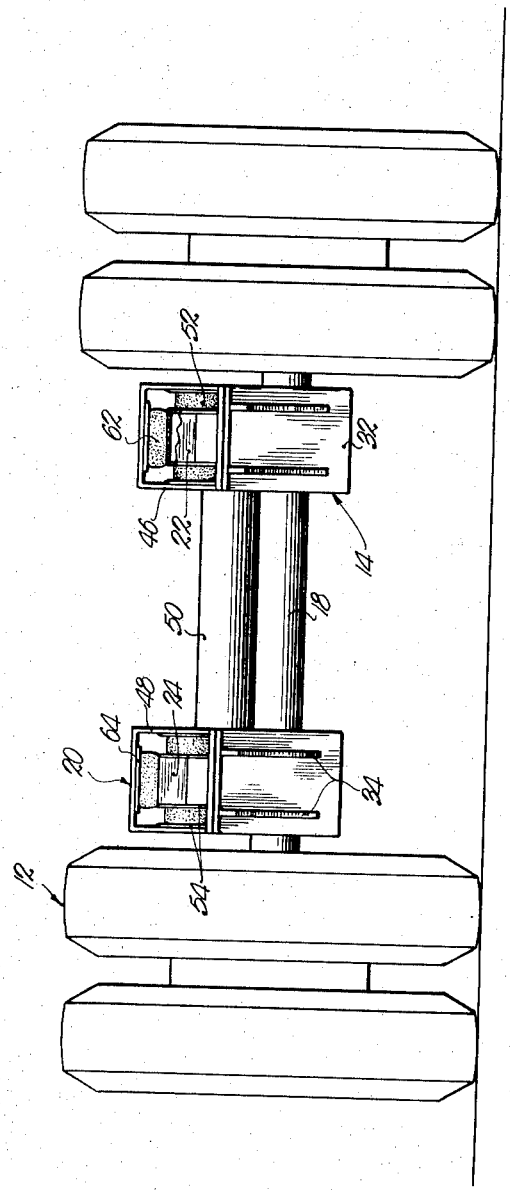
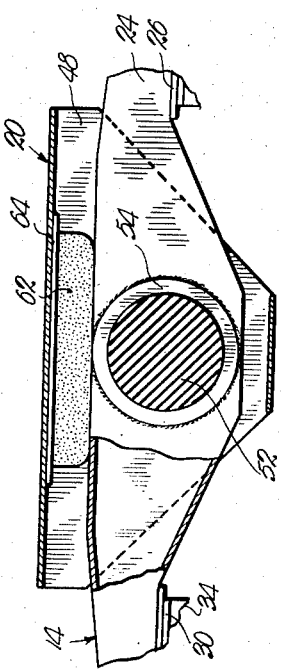
INVENTOR.
Arthur M. Compton
BY
ATTORNEY.

United States Patent Office 2,798,735
Patented July 9, 1957

2,798,735
MULTI-SPRING UNDERCARRIAGE FOR VEHICLES

Arthur M. Compton, Bethel, Kans., assignor, by mesne assignments, to Standard Steel Works, Inc., North Kansas City, Mo., a corporation of Texas Application January 17, 1955, Serial No. 482,035

4 Claims. (Cl. 280—104.5)

This invention relates to improvements in undercarriages for vehicles and particularly trucks and trailers, the primary object being to cushion the load carried thereby in a novel manner through resilient instrumentalities so arranged as to effect a progressive action whereby the various cushioning elements operate successively in their load-bearing functions as the load itself becomes increasingly heavier.

It is the most important object of the instant invention to provide in a running gear or undercarriage of the kind having a pair of wheel and axle assemblies arranged in tandem, novel structure for equalizing distribution of loads on the assemblies, yet permitting freedom of movement of the assemblies as a unit or relatively in a multitude of directions in direct response to unevenness of terrain thereby affording more proper cushioning of the load and relieving strain on the various parts of the undercarriage such as would otherwise tend to cause break-down or reduce the effective life thereof.

Another important object of the instant invention is to provide cushioning means or resilient support means for undercarriages adapted to cushion vertical loads in the usual manner and yet be capable, by its inherent novel construction, of permitting the two wheel and axle assemblies to rise and fall in response to uneven terrain independently, or as a unit about a substantially horizontal axis, to permit the undercarriage to move vertically as a unit toward and away from the overlying load, to permit the axles to deflect individually out of their normal parallel relationship and to permit limited twisting or turning action in the undercarriage, all for the purpose of reducing tire scuff and eliminating the relatively rigid arrangement of conventional structures which are incapable of yielding to the many stresses and strains to which the same are subjected.

A further important object of the present invention is to provide improvements in structures of the aforementioned character which contemplate the utilization throughout of elastic means that are compressible and laterally deformable in lieu of metallic spring structure now in common use, thereby alleviating the weight factor, eliminating lubrication problems and increasing the life of the undercarriage as well as the initial cost of production.

It is a further object of this invention to provide interconnecting structure for a pair of axles that includes parallel beams having laterals embracing the axles which are in turn attached through the medium of elastic bodies of compressible and laterally deformable material, permitting movement of the axles with respect to the interconnecting structure in a number of directions.

Another object of the instant invention is the provision of support structure including a pair of interconnected devices that are similarly attached to the aforesaid beams through the medium of elastic members that are compressible and laterally deformable, presenting a pivot for swinging movement of the undercarriage and movement of the support toward the beams as the load on the support progressively increases.

In the drawings:

Fig. 3 is a rear elevational view thereof.

Fig. 4 is an enlarged, fragmentary, detailed, cross-sectional view taken on line IV—IV of Fig. 2; and Fig. 5 is an enlarged, detailed, cross-sectional view taken on line V—V of Fig. 2.

Figure 1:
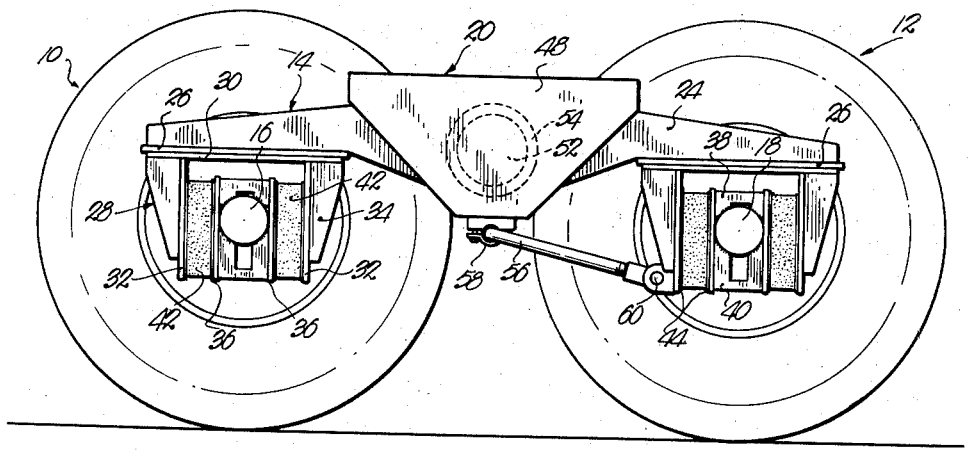
Figure 1 is a side elevational view of a multispring undercarriage for vehicles made pursuant to my present invention.
Figure 2:
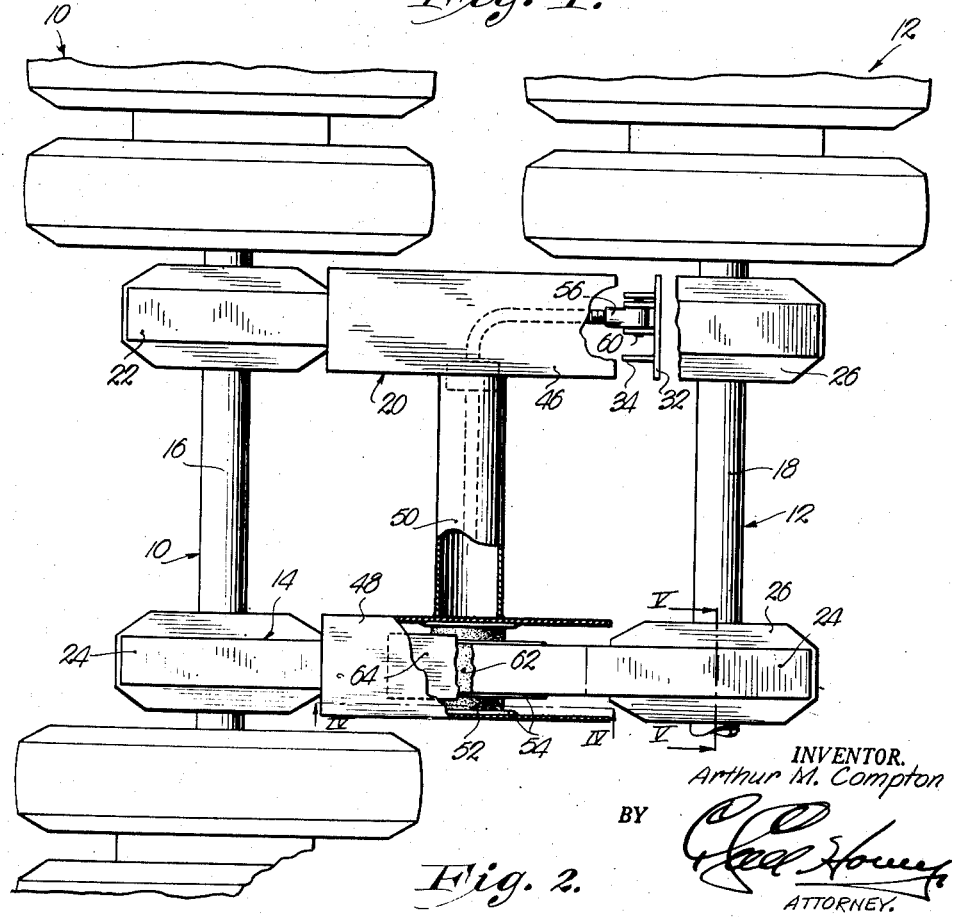
Fig. 2 is a fragmentary top plan view thereof, parts being broken away and in section for clearness.

The undercarriage chosen for illustration of the principles of the instant invention includes front and rear wheel and axle assemblies 10 and 12 respectively, joined by connecting structure 14 that attaches to axles 16 and 18 of assemblies 10 and 12 respectively.

A support for the load adapted to receive the bed (not shown) of a truck, trailer or the like, is attached to the structure 14 in a unique manner and is broadly designated by the numeral 20.

The connecting structure 14 includes a pair of identical, normally parallel beams 22 and 24 that are preferably tubular and each provided with a pair of plates 26 therebeneath overlying the axles 16 and 18 respectively.

A U-shaped frame 28 beneath each plate 26 respectively, includes a secondary plate or bight 30 attached to the plate 26 therebeneath and a pair of down-turned laterals that includes a pair of spaced plates 32 perpendicular to the plate 30 and affixed thereto, together with reinforcing gussets 34 attached to the plates 30 and 32 for reinforcing the latter. Innermost upright plates 36 embracing corresponding axles 16 and 18 normally in spaced parallelism to the plates 32, are secured to the axles through the medium of uppermost and lowermost blocks 38 and 40 respectively, welded or otherwise attached to both the plates 36 and the axles 16 and 18 as the case may be.

Elastic bodies of compressible and laterally deformable material in the nature of blocks 42 of rubber, preferably synthetic, are laminated between a pair of metallic plates 44 bonded thereto and such units 44—42—44 are interposed between plates 32 and 36 and welded or otherwise secured to the latter.

The support 20 is secured to the interconnecting structure 14 in a similar manner and includes a pair of hollow devices 46 and 48 in the nature of inverted channels that embrace the beams 22 and 24 respectively and are interconnected by a cross tube or the like 50. The devices 46 and 48 are preferably disposed midway between the ends of the beams 22 and 24 and each enclose opposed elastic members 52 that are made from compressible and laterally deformable material such as rubber and which may be circular if desired. The disc-like members 52 are laminated between a pair of plates 54 which are in turn secured in any suitable manner directly to the beams 22 and 24 and the devices 46 and 48, as the case may be.

The rear assembly 12 and/or the assembly 10, may be attached to the support 20 in any suitable manner such as through use of a combined U-shaped stabilizer and radius rod unit 56. The bight of the coupling means 56 is rotatably carried by bearings 58 attached to the lowermost ends of the devices 46 and 48, whereas the ends of the legs thereof are pivotally connected to the forwardmost plates 32 of the rear assembly 12 by pivot pins 60.

A compressible element 62 of rubber or the like, overlies each beam 22—24 respectively beneath corresponding devices 46—48 and may be affixed to the latter such as by use of a plate 64 welded to the devices 46—48 and to which plates 64 the elements 62 are bonded.

The resilient bodies 42 are of appreciably greater resistance to compression and lateral deformation than that of the resilient members 52. It is contemplated that normally the members 52 would be capable only of supporting the load of the truck body upon the support 20 and that as soon as the truck became approximately 25% loaded, the members 52 would yield and the support 20 would move downwardly to a position where the load would be supported or cushioned by the elements 62 interposed between the devices 46 and 48 and the beams 22 and 24 as shown in Fig. 4. As the load increases, the elements 62 will progressively compress and such load will thereafter be supported by all three elastic mediums 42, 52 and 62.

It can now be seen that the undercarriage is extremely sensitive to all terrain changes and is capable of yielding in a number of directions during turns and other forces and strains to which the same is subjected during normal use.

Since the rubber blocks 42 are all compressible, the axles 16 and 18 need not remain in parallelism at all times, but as conditions require, the blocks 42 may compress between plates 32 and 36. Similarly, since the blocks 42 are laterally deformable by their very elasticity, the axles 16 and 18 may rise and fall at either end thereof with respect to the beams 22 and 24.

Similar action takes place in the resilient members 52 in that the support 20 may move toward and away from the structure 14 as aforementioned. Still further, the aligned discs 52 serve as resilient pivots for the structure 14, permitting the beams 22 and 24 to swing together as a unit or independently of each other on a substantially horizontal axis through the members 52. This freedom of movement of the axles 16 and 18 and of the beams 22 and 24 relatively, or as a unit, may take place whether or not the elements 62 are compressed since the resiliency of the latter still permits swinging movement of the beams 22 and 24 on the said horizontal axis and permits movement of the beams 22 and 24 in and out of parallelism while the elements 62 are squeezed tightly between the support 20 and the structure 14.

Fore and aft loads are taken by the combined stabilizer and radius rod means 56 which also prevents twisting of the walking beams 22 and 24 about vertical axes during cornering operations.

An important feature of the instant invention however, is the fact that when a load is placed on the support 20, the central members or shear springs 52 will deflect transferring their load progressively to the compression rubber 62, such that when the truck or the like reaches full load, the greatest portion of such load will be carried on the compression rubbers 62. This provides a distinct progressive action as loads increase without removing the effect of the shear spring bodies 42 in cooperating with the elements 62 in cushioning the load.

Having thus described the invention what is claimed as new and desired to be secured by Letters Patent is:

1. In an undercarriage for vehicles, a pair of spaced wheel and axle assemblies; a pair of spaced beams spanning the distance between the axles of said assemblies; means attaching the beams to the axles; a support including a pair of interconnected, U-shaped devices, one for each beam respectively disposed in embracing relationship to the beams intermediate the ends of the latter; a pair of opposed, elastic members of compressible and laterally deformable material for each beam respectively within corresponding devices and attached directly to the sides of the beams; and means connecting the members to corresponding devices, each device having a bight overlying the corresponding beam and a pair of spaced legs depending from the bight, rendering the devices open at the ends thereof for free vertical swinging movement of the beams relative to the devices, there being a cross-element joining the devices, said elastic members being secured to the inner faces of the legs in alignment with the cross element whereby the beams rotate about horizontal axes aligned with the axis of the cross element.

2. In an undercarriage for vehicles, a pair of spaced wheel and axle assemblies; a pair of spaced beams overlying the axles of said assemblies, each beam having a pair of laterals for each axle respectively depending therefrom, said laterals embracing the axles; an elastic body of compressible and laterally deformable material attached to each lateral respectively; means connecting the bodies directly to corresponding axles; a support including a pair of interconnected, U-shaped devices, one for each beam respectively disposed in embracing relationship to the beams intermediate the ends of the latter; a pair of opposed, elastic members of compressible and laterally deformable material for each beam respectively within corresponding devices and attached directly to the sides of the beams; and means connecting the members to corresponding devices, each device having a bight overlying the corresponding beam and a pair of spaced legs depending from the bight, rendering the devices open at the ends thereof for free vertical swinging movement of the beams relative to the devices, there being a cross-element joining the devices, said elastic members being secured to the inner faces of the legs in alignment with the cross element whereby the beams rotate about horizontal axes aligned with the axis of the cross element.

3. In an undercarriage for vehicles, a pair of spaced wheel and axle assemblies; a pair of spaced beams overlying the axles of said assemblies, each beam having a pair of laterals for each axle respectively depending therefrom, said laterals embracing the axles; an elastic body of compressible and laterally deformable material attached to each lateral respectively; means connecting the bodies directly to corresponding axles; a support including a pair of interconnected, U-shaped devices, one for each beam respectively disposed in embracing relationship to the beams intermediate the ends of the latter; a pair of opposed, elastic members of compressible and laterally deformable material for each beam respectively within corresponding devices and attached directly to the sides of the beams; means connecting the members to corresponding devices; and an element of compressible material overlying each beam respectively, said elements being separate from the beams and secured to corresponding devices therewithin for cushioning a load placed on the devices when such load is sufficient to deform said members and compress the elements between the devices and the beams, each device having a bight overlying the corresponding beam and a pair of spaced legs depending from the bight, rendering the devices open at the ends thereof for free vertical swinging movement of the beams relative to the devices, there being a cross-element joining the devices, said elastic members being secured to the inner faces of the legs in alignment with the cross element whereby the beams rotate about horizontal axes aligned with the axis of the cross element.

4. In an undercarriage for vehicles, a pair of spaced wheel and axle assemblies; a pair of spaced beams spanning the distance between the axles of said assemblies; means attaching the beams to the axles; a support including a pair of interconnected, U-shaped devices, one for each beam respectively disposed in embracing relationship to the beams intermediate the ends of the latter; a pair of opposed, elastic members of compressible and laterally deformable material for each beam respectively within corresponding devices and attached directly to the sides of the beams; means connecting the members to corresponding devices; and an element of compressible material overlying each beam respectively, said elements being separate from the beams and secured to the corresponding devices therewithin for cushioning a load placed on the devices when such load is sufficient to deform said members and compress the elements between the devices and the beams, each device having a bight overlying the corresponding beam and a pair of spaced legs depending from the bight, rendering the devices open at the ends thereof for free vertical swinging movement of the beams relative to the devices, there being a cross-element joining the devices, said elastic members being secured to the inner faces of the legs in alignment with the cross element whereby the beams rotate about horizontal axes aligned with the axis of the cross element.

References Cited in the file of this patent

UNITED STATES PATENTS

| | | |
|---|---|---|
| 2,318,257 | Peterman | May 4, 1943 |
| 2,704,664 | Hickman | Mar. 22, 1955 |
| 2,739,281 | Hickman | Mar. 27, 1956 |